United States Patent Office 3,247,172
Patented Apr. 19, 1966

3,247,172
COLORED COPOLYMERS OF CYCLOPENTADIENE AND INDOLE OR PYRROLE
Jan W. H. Faber, Hilton, N.Y., assignor to Eastman Kodak Company, Rochester, N.Y., a corporation of New Jersey
No Drawing. Filed Sept. 24, 1962, Ser. No. 225,882
11 Claims. (Cl. 260—82.1)

This invention relates to relatively low molecular weight copolymers of cyclopentadiene and aminopolyenes, and to a process for preparing the same.

P. V. French et al., in Proceedings of the Chemical Society, pages 248–250, July 1960, describe highly colored homopolymers of cyclopentadiene obtained by catalysts of the colorless cyclopentadiene polymer with trichloroacetic acid. However, such polymers have been found to be unstable towards oxygen and protic solvents, and hence are of limited practical value. I have now made the discovery that certain copolymers of cyclopentadiene can be prepared using cationic catalysts such as hydrogen chloride, stannic chloride, aluminum chloride, and the like, in protic or aprotic solvents such as, for example, methanol or chloroform, and that the protonated forms or hydrochloride salt forms of these copolymers are highly colored varying between deep purple and bright red, and that they are remarkably stable both as solids and in the form of their neutral or acid solutions. They are soluble in either protic or aprotic solvents depending on the mode of preparation, and are particularly useful as filter layers, antihalation and antistatic backings and overcoatings in photographic elements, as semi-conductors, ultra-violet stabilizers, etc., due to the absorption of various wavelengths as well as to their ionic character. Solubilities can be adjusted, in case a carrier is used in the coating compositions. However, both color and ionic character can be discharged by the addition of base compounds such as alkaline photographic developing agents which is a highly desirable property.

It is, accordingly, an object of the invention to provide highly colored, protonated copolymers of cyclopentadiene that are stable as crystalline solids and in neutral or acid solutions. Another object is to provide films and coatings of the same, especially for applications in the photographic art. Another object is to provide a process for preparing the said copolymers. Other objects will become apparent hereinafter.

In accordance with the invention, I prepare the copolymers of the invention by copolymerizing a mixture comprising from about 20 to 80% by weight of cyclopentadiene and from 80 to 20% by weight of an aminopolyene such as indole or pyrrole, in the presence of a cationic polymerization catalyst such as stannic chloride ($SnCl_4$), hydrogen chloride gas, aluminum chloride, boron trifluoride, ferric chloride, etc., at a temperature of from about $-50°$ C. to $100°$ C. In the case of stannic chloride, a temperature range of from about $30°$ C. to $100°$ C. is more efficacious, whereas with hydrogen chloride gas temperatures from about $-50°$ C. to $0°$ C. give the best results. Proportions of the aminopolyene of less than 20% give undesirable copolymers which characterized by becoming brittle on standing. Advantageously, the reaction is carried out in a solvent medium which may be protic or aprotic, but preferably in chloroform. Other solvents that can be used as reaction mediums include benzene, toluene or thylene dichloride. The deeply colored copolymer obtained may then be isolated by pouring the polymerization reaction mixture into a nonsolvent for the copolymer such as acetone, ether, ligroin, petroleum, ether and similar solvents. The amount of catalyst employed can vary widely, but preferably from about 0.25 to 25%, based on the total weight of monomers to be copolymerized. In general, more catalyst is required where indole is the major polymerizable component. Mixtures of two or more of the catalysts can be used, if desired. While the polymerizations are preferably carried out under normal atmospheric conditions, pressures substantially above or below atmospheric can also be employed. The molecular weights of the copolymers produced as above described are relatively low—ranging from about 300 to 2000. The copolymeric products contain about the same proportions of combined components as were present in the starting polymerization mixtures.

The following examples will serve to illustrate further the manner of practicing the invention.

*Example 1*

In a one-liter beaker are placed 66 g. (1 mole) of cycloptentadiene and 100 cc. of chloroform. With vigorous stirring 2 cc. of a 5% by weight solution of stannic chloride ($SnCl_4$) in chloroform was added slowly. At this point, the temperature was $40°$ C.; then it rose slowly to $56°$ C. and the chloroform began to reflux gently. When the temperature of the reaction mixture began to decrease, 20 g. (0.17 mole) of indole in 20 cc. of chloroform were added. The color changed to a pale yellow. The reaction mixture was stirred for 15 minutes, then 2 cc. more of the catalyst solution were added, and the mixture was refluxed for 15 minutes more with stirring. The polymer which formed precipitated out of solution as a blue-purple colored and granular material, which was then filtered out, redissolved in methanol and reprecipitated into ligroin without loss of color. It had an intrinsic viscosity of 0.2 in methanol in a concentration of 25 mg. per 100 cc. of methanol. This corresponds to molecular weight of about 2000. Analysis of this polymeric product indicated that it was the hydrochloride salt of a copolymer of approximately 77% by weight of recurring cyclopentadiene units and 23% by weight of recurring indole units. On coating a solution of this copolymer in methanol, a thin, clear film was obtained which showed appreciable electric conductivity when measured between two parallel electrodes placed upon the film. When the solution was applied as a backing layer onto a sheet of cellulose acetate photographic film, no static charge defects were noticeable in the exposed and processed film. Also, all color had been discharged from this backing layer during the processing. The solution was also found useful as an antistatic overcoating layer over gelatino-silver halide emulsion layers.

*Example 2*

In a one-liter beaker were placed 58 g. (0.5 mole) of indole and 250 cc. of chloroform. Slowly a 50:50 solution of stannic chloride and chloroform was added with stirring. After 8 cc. of the catalyst solution had been added, the reaction mixture became yellow and slightly cloudy. Then 16.5 g. (0.25 mole) of 1,3-cyclopentadiene were added. Another 32 cc. of the catalyst solution was then added slowly. The temperature rose slowly thereafter until at $58°$ C. a dark red polymer separated out of the solution. This was separated, dissolved in methanol, and precipitated in ligroin. The process was repeated. A reddish-purple granular polymer was obtained which had an intrinsic viscosity of 0.07 in 25 mg. concentration in 100 cc. of methanol at room temperature corresponding to a molecular weight of about 300. Analysis indicated that this product was the hydrochloride salt of a copolymer of approximately 22% by weight of recurring cyclopentadiene units and 78% by weight of recurring indole units. The properties and utility of this copolymer were generally the same as those shown for the product of Example 1.

Example 3

In a one-liter beaker were placed 67 g. (1 mole) of pyrrole and 200 cc. of chloroform. The temperature was then adjusted to −40° C. in an actone-Dry Ice (solid carbon dioxide) bath. The mixture was stirred by hand while hydrogen chloride gas bubbled in slowly. The temperature was maintained between −40° C. and −33° C. for one hour, the solution turning pale yellow and slightly viscous.

Then 66 g. (1 mole) of 1,3-cyclopentadiene mixed in 81 cc. of chloroform was added a few ccs. at a time with stirring, while maintaining temperature below −33° C. The addition required one hour to complete. Hydrogen chloride gas was then bubbled in for another two hours keeping the temperature constant at −33° C.

The solution turned pink and more viscous. It was then poured into ligroin to drive off the hydrogen chloride gas and to precipitate the polymer. This turned dark red on standing overnight and was then dissolved in methanol and precipitated in ether. This procedure was repeated several times. A red powdery material was finally obtained. Analysis indicated that this material was the hydrochloride salt of a copolymer consisting of approximately 50% by weight of recurring cyclopentadiene units and 50% by weight of recurring pyrrole units. It had an intrinsic viscosity of 0.04 as measured in 25 mg. solution thereof in 100 cc. methanol at room temperature, corresponding to molecular weight of about 300. Coatings of this copolymer were also useful as antistatic backing layers on photographic films.

Example 4

In a one-liter beaker were mixed 66 g. (1 mole) of 1,3-cyclopentadiene and 200 cc. of cholorform, and the temperature adjusted to −40° C. in a Dry Ice bath.

Hydrogen chloride gas was then bubbled in and 67 g. (1 mole) of pyrrole was added in 3 cc. portions over a period of one and one-half hours. The temperature rose with each addition and the color of the solution changed finally to orange-red color.

The reaction mixture was allowed to come to room temperature and left standing for 65 hours. A hard, dark red, chloroform insoluble polymer precipitated out of solution. This was dissolved in methanol and precipitated in acetone, followed by extraction of the precipitated polymer with a 50:50 chloroform-acetone mixture over a period of 5 days. A dark red polymer was obtained finally which was identified as the hydrochloride salt of a copolymer of approximately 50% by weight of recurring cyclopentadiene units and 50% by weight of recurring pyrrole units. It had an intrinsic viscosity of 0.08 as measured in 25 mg. solution thereof in methanol at 20° C., corresponding to a molecular weight of approximately 350. Coatings from 5% methanol solutions thereof produced thin continuous layers which were conductive and reduced static charge buildup when applied as backings on photographic films.

While the preceding examples have described copolymers of the invention in just certain proportions of components, it will be understood that the procedures of the examples are equally applicable for the preparation of any protonated copolymers of the invention coming within the specified limits of from 20–80% by weight of cyclopentadiene units and from 80–20% by weight of either indole units or pyrrole units. Also, it should be further understood that any mixtures of indole and pyrrole can be used as comonomers provided only that their total weight is not less than 20% and not more than 80% of the total weight of the monomers to be copolymerized. These protonated copolymers likewise on coating into films or antistatic layers on photographic films become colorless in the basic processing solutions. All of the protonated, colored copolymers of the invention, as previously mentioned, are also useful as filter layers in photographic film supports.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A solid copolymer consisting essentially of from 20–80% by weight of recurring cyclopentadiene units and from 80–20% by weight of recurring units selected from the group consisting of indole units, pyrrole units and a mixture of indole and pyrrole units, the said copolymer being in the halide salt form and having a molecular weight of from 300 to 2000.

2. A solid copolymer consisting essentially of from 20–80% by weight of recurring cyclopentadiene units and from 80–20% by weight of recurring indole units, the said copolymer being in the halide salt form and having a molecular weight of from 300 to 2000.

3. A solid copolymer consisting essentially of from 20–80% by weight of recurring cyclopentadiene units and from 80–20% by weight of recurring pyrrole units, the said copolymer being in the halide salt form and having a molecular weight of from 300 to 2000.

4. The solid hydrochloride salt of a copolymer consisting essentially of from 20–80% by weight of recurring cyclopentadiene units and from 80–20% by weight of recurring units selected from the group consisting of indole units, pyrrole units and a mixture of indole and pyrrole units, the said copolymeric salt having a molecular weight of from 300 to 2000.

5. The solid hydrochloride salt of a copolymer consisting essentially of from 20–80% by weight of recurring cyclopentadiene units and from 80–20% by weight of recurring indole units, the said copolymeric salt having a molecular weight of from 300 to 2000.

6. The solid hydrochloride salt of a copolymer consisting essentially of from 20–80% by weight of recurring cyclopentadiene units and from 80–20% by weight of recurring pyrrole units, the said copolymeric salt having a molecular weight of from 300 to 2000.

7. A process for preparing a solid, protonated copolymer which comprises contacting a mixture consisting essentially of from 20–80% by weight cyclopentadiene and 80–20% by weight of a monomer selected from the group consisting of indole, pyrrole and a mixture of indole and pyrrole with a cationic hydrogen halide forming polymerization catalyst at from −50 to 100° C.

8. The process according to claim 7 wherein the said monomer is indole and wherein the said cationic polymmerization catalyst is stannic chloride.

9. The process according to claim 7 wherein the said monomer is pyrrole and wherein the said cationic polymerization catalyst is stannic chloride.

10. The process according to claim 7 wherein the said monomer is indole and the said cationic polymerization catalyst is hydrogen chloride gas.

11. The process according to claim 7 wherein the said monomer is pyrrole and the said cationic polymerization catalyst is hydrogen chloride gas.

References Cited by the Examiner

UNITED STATES PATENTS

| | | | |
|---|---|---|---|
| 2,521,359 | 9/1950 | Garber | 260—82.1 |
| 2,529,316 | 11/1950 | Smyers et al. | 260—82.1 |

OTHER REFERENCES

Brown et al., Chem. Soc. Jour. (London), Pt. 3 (1957), pp. 3608–3611.

JOSEPH L. SCHOFER, *Primary Examiner.*